March 7, 1961 N. F. McLEOD 2,974,131
REMOVAL OF OLEFIN POLYMERS FROM SOLUTION
Filed Sept. 4, 1956
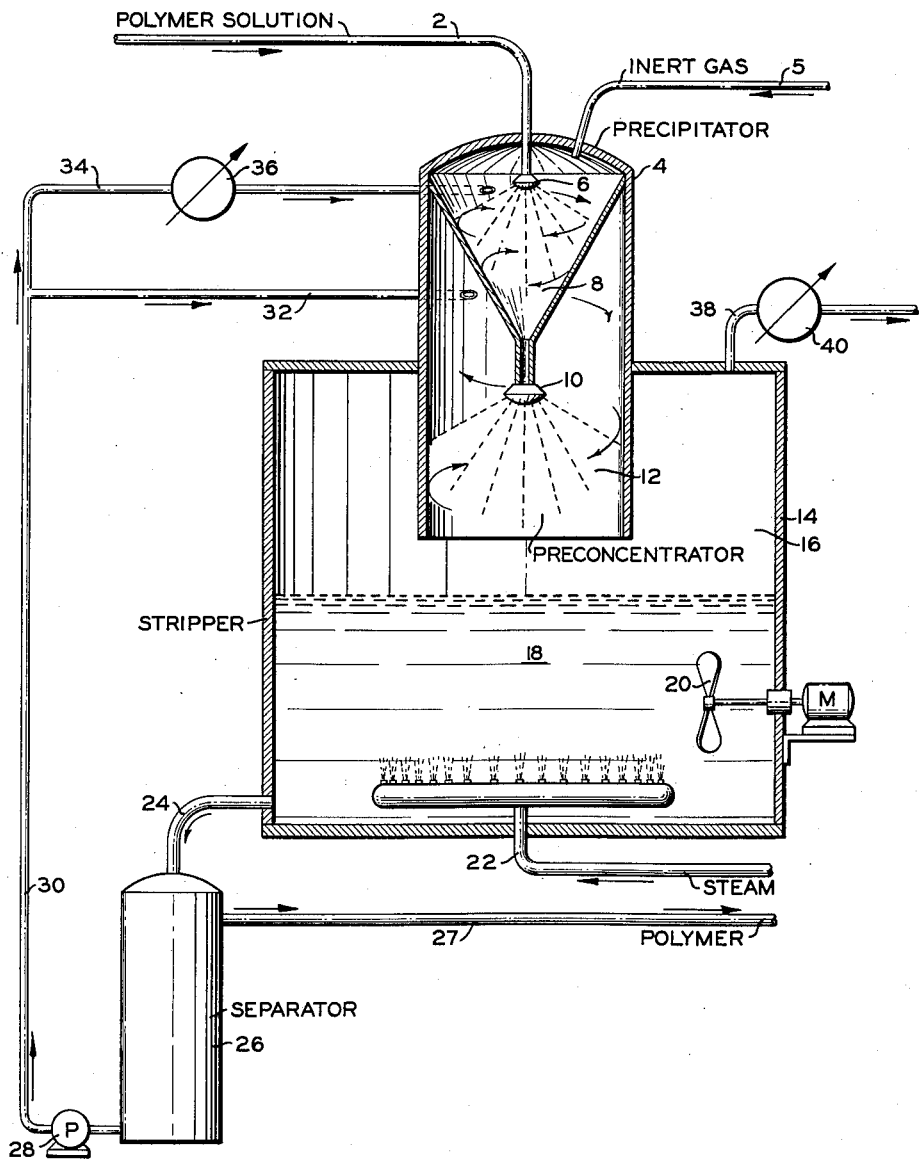
INVENTOR.
NORMAN F. McLEOD
BY *Hudson and Young*
ATTORNEYS United States Patent Office 2,974,131
Patented Mar. 7, 1961

2,974,131

REMOVAL OF OLEFIN POLYMERS FROM SOLUTION

Norman F. McLeod, Bartlesville, Okla., assignor to Phillips Petroleum Company, a corporation of Delaware Filed Sept. 4, 1956, Ser. No. 607,864

10 Claims. (Cl. 260—94.9)

This invention relates to method and means for removing normally solid olefin polymers from solution. More particularly, it relates to method and means for precipitating dissolved polymer from a solvent material by contacting the solution with water. Still more particularly, it relates to method and means for precipitating normally solid polymers from a polymer solution by spraying the solution onto a surface wetted with moving water.

In the usual methods of preparing solid polymers, the product is obtained as a solution of polymer in a solvent or diluent material. Inasmuch as the major uses of the polymer require a solid product, it is necessary that the polymer be precipitated from solution and separated from the solvent material. A number of methods have been proposed for treating the polymer solution to accomplish this purpose. In one method, a slurry of precipitated polymer in solvent is provided by spraying a solution of polymer into liquid water below the surface thereof. This invention provides an improvement over this method.

After the polymer is precipitated from solution, it is necessary that the liquid and solid be separated in order to provide the desired polymer product. One method proposed for this purpose comprises introducing the slurry to a stripping zone wherein solvent removal is effected by heat and contact with steam. Although the desired separation can be effected in this manner, it has been found that considerable fouling of the interior of the stripping zone frequently occurs during the process.

It is an object of this invention to provide improved method and apparatus for recovering normally solid olefin polymers from solution.

Another object of the invention is to provide improved method and apparatus for precipitating polymers from solution by contact with water.

Still another object of the invention is to provide improved method and apparatus for preventing fouling of process equipment used to precipitate solid polymers from solution.

Yet another object of the invention is to provide improved method and apparatus for precipitating polymer from solution and separating solvent from the resulting mixture.

These and other objects of the invention will become more readily apparent from the following detailed description and discussion.

The aforedescribed objects are achieved broadly by introducing a polymer solution to a precipitation zone containing an inert gas and having a surface wetted with moving water having a temperature below the temperature of the solution and spraying the solution onto said wetted surface whereby polymer is precipitated from solution and dispersed in the water. In a more specific aspect of the invention, the precipitation zone is maintained under a positive pressure by the introduction thereto of an inert gas. In still another aspect of the invention, precipitated polymer, water and solvent are pressured from the precipitation zone by means of inert gas and the mixture is sprayed onto a second surface wetted with heated water in a preconcentrating zone disposed in the vapor space of a stripping zone whereby a portion of the solvent is vaporized from the mixture, following which the water, polymer and solvent accumulate in the stripping zone and are contacted with steam for the removal of the remaining solvent.

This invention is applicable in general to the treatment of solid polymers. It has particular utility when applied to the treatment of olefin polymers such as, for example, polymers or copolymers of monoolefins like ethylene, propylene, butylene, etc., also copolymers of monoolefins and diolefins such as butadiene, isoprene, etc. Olefin polymers more usually treated are polymers of 1-olefins having a maximum of 8 carbon atoms per molecule and no branching nearer the double bond than the 4-position.

In a preferred embodiment, the invention is directed to the treatment of polymer materials prepared from ethylene which have a density of at least 0.94 and preferably 0.96 or higher and a crystallinity of at least 70 percent and preferably at least 80% at ambient temperatures. It has been found that the method and apparatus of this invention are particularly effective in the treatment of these polymers. While these polymers represent a preferred embodiment of the invention other polymers, as related above, are also treated and it is not intended that the scope of the invention be limited to the treatment of any particular polymer or polymers.

A number of methods are available for preparing polymers of olefins. One method is described in detail in a copending application of Hogan and Banks, Serial No. 476,306, filed December 30, 1954 and now abandoned. This particular method utilizes a chromium oxide catalyst, preferably containing hexavalent chromium, with silica, alumina, silica-alumina, zirconia, thoria, etc. In the method of this application, olefins are polymerized in the presence of a hydrocarbon diluent, for example, an acyclic, alicyclic or aromatic compound which is inert and in which the formed polymer is soluble. The reaction is carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F. and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity at ambient temperatures.

Other procedures which employ different catalysts are also used for preparing olefin polymers. For example, polymers are prepared in the presence of organometallic compounds such as triethylaluminum plus titanium tetrachloride, mixtures of ethylaluminum halides with titanium tetrachloride and the like. Another group of catalysts which is used comprises a halide of a group IV metal such as, for example, titanium tetrachloride, silicon tetra bromide, zirconium tetrachloride, tin tetrabromide, etc., with one or more free metals selected from the group consisting of sodium, potassium, lithium, rubidium, zinc, cadmium and aluminum.

The solvent or diluent employed in the polymerization reaction includes in general paraffins which dissolve the polymers at the temperature employed in the reaction zone. Among the more useful solvents are acyclic paraffins having between about 3 and 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents are also used however in some instances they or impurities therein tend to shorten the catalyst life, therefore their use depends on the importance of catalyst life. All of the foregoing and, in addition, other hydrocarbon diluents which are relatively inert and in the liquid state at the reaction conditions may also be employed in carrying out the reaction of olefins to form solid polymers.

In carrying out this invention, in one embodiment thereof, a heated solution of polymer, such as a polymer of ethylene, in a solvent, for example, cyclohexane, is sprayed onto a surface wetted with water. The wetted surface is maintained at a lower temperature then the heated solution by controlling the temperature of the water introduced thereto. The polymer solution upon striking the wetted surface, is reduced in temperature whereby polymer is precipitated. The velocity of contact of the wetting liquid and the polymer solution is such that the precipitated polymer is finely dispersed in the water, thereby preventing agglomeration of polymer particles. The presence of the liquid film and the velocity thereof also prevents the polymer from sticking to the wetted surface. The wetted surface is disposed in such a manner that the wetting water flows downwardly into an accumulating space of reduced cross-section, from which polymer, water and solvent are discharged. Preferably, the wetted surface is a continuous concave surface, such as, for example, a cylindrical surface, an inverted conical surface, etc., disposed substantially vertically. With this type of surface, it is possible to provide a water flow path of great length and an extended residence time of water on the wetted surface by introducing water to the surface tangentially whereby the downwardly moving water has a horizontal as well as a vertical component of flow.

It is preferred that at least the major portion of the polymer precipitation take place after the polymer solution is deposited on the wetted film. To assure this it is necessary to minimize vaporization of solvent from the solution and cooling of the solution as it passes through the space between the spray nozzle and the wetted surface. In the method of this invention solvent vaporization is controlled by providing an atmosphere of inert gas, such as nitrogen, in the precipitation zone and maintaining a sufficient pressure in this zone to suppress vaporization. In addition to nitrogen other materials in the gaseous form, such as carbon monoxide, carbon dioxide, methane, ethane, propane, etc. can be used to suppress vaporization. It may be desirable to use heated solvent in place of the gases mentioned. Although this would raise the mix temperature it would minimize separation and recovery problems. Usually vaporization is held to a minimum by maintaining a precipitation zone pressure of between about 10 and about 200 p.s.i.g., and preferably at least about 20 p.s.i.g. The inert atmosphere thereby provided has certain additional advantages. In the polymer-solvent separation step hereinafter described precipitated polymer and solvent from the precipitation zone are passed through another spray nozzle and introduced to a preconcentration and stripping zone. Transfer of this material requires a substantial amount of pressure energy which is conveniently supplied by the high pressure inert gas. In addition, a portion of the inert gas, due to the elevated pressure, is dissolved and otherwise entrained in the material and provides a beneficial effect in the preconcentrating zone, also hereinafter described.

The temperature of the polymer solution to be treated in this process varies depending on the particular solvent employed and the amount of polymer in the solution. More usually, the feed solution contains between about 2 and about 6 percent of polymer by weight. To maintain this quantity of polymer in solution, it is necessary that the temperature of the solution be maintained at an elevated level, usually between about 150 and about 300° F. The amount of polymer which is removed from solution in the precipitation zone may be varied over a wide range and is controlled by appropriately adjusting the quantity and temperature of the water sprayed to the wetted surface. When it is desired to precipitate the major proportion of the polymer, namely between about 50 and about 95 percent by weight of the total amount of solution, the water introduced to the wetted surface has a temperature between about 100° F. and about 170° F. and is introduced in a sufficient quantity to provide a ratio of water to polymer solution of between about 1 and about 15 pounds per pound and preferably between about 5 and about 8 pounds per pound. Under these conditions, the temperature of the wetted surface, after dispersion of the polymer in the water, usually lies within the range of between about 110 and about 160° F. The amount of wetted surface required in carrying out the invention depends principally on the rate at which polymer solution is introduced to the precipitation zone; usually effective precipitation and dispersion is provided by employing a feed rate to surface ratio of between about 10 and about 40 gallons of solution per hour per square foot. The depth of the water on the wetted surface varies between about 0.05 and about 1 inch and should not exceed a depth which will overcome spiral flow of the wetting water.

It has been found that the aforedescribed method of operation provides a marked improvement over previous methods of precipitating polymers from solution. For example, the power consumption involved in spraying a polymer solution onto a wetted surface is substantially less than that required to introduce the same solution beneath the level of liquid water. Also, it has been found that the method described herein provides for uniform dispersion of precipitated polymer in the water phase in a finely subdivided form thereby minimizing polymer coagulation.

As previously stated, one of the problems attendant with separation of solvent from precipitated polymer is the agglomerating tendency of the polymer which may cause extensive fouling of the apparatus used for this purpose. It has been found that the concentration of polymer in the solvent has a substantial effect on the agglomerating properties of this material. For example, it appears that the adhesive tendency of the polymer is greatest when this material is present in the solvent in an amount of between about 2 and about 6 percent by weight. When the concentration of polymer is either above or below this range, there is much less tendency for this material to adhere to metal surfaces. In the method of this invention, a procedure is provided whereby the polymer-solvent mixture is passed through the range of maximum agglomeration without fouling of the processing apparatus.

In carrying out this aspect of the invention the mixture of precipitated polymers, solvent and water which accumulates in the bottom of the precipitation zone is pressured to a preconcentrating zone which is disposed within the vapor space of a steam stripping zone. The preconcentrating zone contains a continuous concave surface, for example, the inner surface of an elongated cylinder, which is disposed vertically in said vapor space. This surface is continuously supplied with heated water to provide a moving film of liquid thereon. The slurry material is sprayed on the wetted surface from a central portion of the preconcentrating zone, passing through a vapor space before contacting said surface. During this operation, steam introduced to the stripping zone passes upwardly into the vapor space in contact with the sprayed solution and the wetted surface. Due to the partial pressure effect of the steam and the temperature of the heated water film solvent is vaporized from the sprayed slurry. When the slurry contacts the wetted wall of the preconcentrating zone, the velocity of contact of the wetting liquid and slurry causes the polymer to be dispersed therein, thereby preventing agglomeration of polymer particles. The presence of the liquid film and the velocity thereof also prevents the polymer from sticking to the walls of the predrying zone. As the polymer, solvent-water mixture passes downwardly along the wetting surface, it is continuously exposed to steam, thus effecting a continuous evaporation of solvent.

Leaving the preconcentrating zone, the polymer-water-solvent mixture drops through the stripping zone vapor space into a liquid mixture of water, solvent and polymer. Steam is introduced below the level of the liquid mixture in sufficient quantities to provide a temperature and stripping effect which is adequate to remove the remaining solvent from the mixture. A product, comprising polymer and water, essentially free from solvent is withdrawn from the stripping zone, usually from the bottom portion thereof. This material is passed through additional processing operations, for example, skimming and drying, whereby a dried solvent-free polymer product is provided.

In view of the agglomerating tendencies of the polymer, it is desirable that the polymer-solvent slurry entering the preconcentrating zone be maintained below about 8 percent polymer by weight. More usually, the concentration of polymer in the entering slurry is between about 2 and about 6 percent. During passage of the polymer-solvent-water mixture through the preconcentrating zone, the combined effect of the steam and the extended water surface acts to reduce the amount of solvent in the mixture to provide a polymer concentration about 6 percent by weight and, preferably, between about 8 percent and about 15 percent, relative to the solvent present.

An important feature in determining the agglomerating properties of the polymer relates to the physical characteristics of this material during the solvent removal process. For example, if the polymer during solvent removal is present as large particles or chunks, it may well contain occluded solvent which will not be easily removed by heat or stripping. Thus, even after treatment in the stripping zone solvent may be present in a sufficient amount to provide a ratio of polymer-to-solvent in the agglomerating range. In the method of this invention dispersion of the polymer in the water film prevents the formation of large particles of polymer and eliminates the problem of solvent occlusion.

Another factor in the operation of the preconcentrating zone is the time during which the polymer-solvent slurry is in contact with steam and the water film. More usually, in order to provide the desired solvent removal, the polymer is retained in the preconcentrating zone for a period of time between about 0.1 and about 5 seconds and preferably between about 0.5 and about 2 seconds. To provide this residence time with a water film moving linearly in a vertical direction would require a preconcentrating zone of extended length. In the method of this invention, the preconcentrating zone of substantially reduced length is provided by introducing water thereto tangentially to the wetted surface whereby the water passes through a spirally descending path through said zone. In this way, it is possible to provide a wetted surface of greatly extended flow length and at the same time maintain a sufficient water velocity to provide effective dispersion of the polymer. The velocity of the water film is generally maintained between about 0.1 and about 20 feet per second and preferably between about 1 and about 5 feet per second. A suitable residence time within the preconcentrating zone is obtained by providing a polymer-solvent slurry feed rate of between about 200 and about 1500 pounds per hour per square foot of wetted surface, and preferably between about 600 and about 1200 pounds per hour per square foot. The depth of the water on the wetted surface must be sufficient to provide the desired polymer dispersion but not so great as to overcome the spiral flow of the wetting water. Usually, sufficient water is introduced to the preconcentrating zone to provide a wetted surface having a water depth of between about 0.05 and about 1 inch.

The temperature of the preconcentrating zone is ordinarily in the same range as the temperature in the stripping zone proper, that is between about 120 and about 300° F., depending on the particular polymer being treated and the solvent material to be removed therefrom. As previously stated vaporization of solvent in the preconcentrating zone is effected by a combination of the heat of the water on the wetted surface and the partial pressure effect of the steam in the stripper vapor space. The water which is supplied to the wetted surface is conveniently obtained by recycling water separated from the polymer-water mixture removed as product from the stripping zone. This provides a water film which initially has a temperature substantially equal to the temperature in the stripping zone. The polymer slurry entering the preconcentrating zone is at relatively low temperature, usually between about 100° F. and about 200° F. It is desirable to maintain a temperature differential of between about 25° F. and about 100° F. between the entering slurry and the wetted wall. The two streams of course stabilize at some intermediate temperature before the polymer-solvent-water mixture leaves the wetted surface.

The amount of steam which is introduced to the stripping zone will depend on the structure of the zone, the polymer being treated, and the particular solvent to be removed. More usually, the quantity of steam required is between about 0.01 and about 2 pounds per pound of polymer-solvent slurry feed. The stripping operation may be carried out over a range of pressures from below atmospheric to superatmospheric. It is preferred, however, to operate usually between about 14 and about 16 p.s.i.a.

Under the conditions of temperature and pressure existing in the stripping zone the steam leaving the liquid surface of this zone and entering the preconcentrating zone contains a substantial amount of solvent admixed with it. Inasmuch as considerations of equilibrium limit the amount of solvent which can be present in the steam-solvent mixture, the quantity of solvent which can be removed from the slurry in the preconcentrating zone is dependent on the concentration of solvent in the steam entering this zone. In order to provide a more effective removal of solvent during preconcentrating, it may be desirable to admit a quantity of steam directly to the preconcentrating zone in addition to the stripping steam. Since steam introduced to the stripping zone initially has a temperature of at least 212° F., the temperature of the steam-solvent mixture entering the preconcentrating zone is increased by the introduction of fresh steam, thus providing a higher temperature in the latter zone than in the stripping zone proper. The two factors of higher temperature and higher steam to solvent ratio in the vapor act to provide a quicker and/or greater removal of solvent from the polymer slurry, thus providing a degree of flexibility in the process.

It is usually desirable to provide agitation in the liquid section of the stripping zone. This aids in the stripping operation and also prevents settling of polymer from the water-polymer mixture.

In order to more clearly define the invention and provide a better understanding thereof reference is had to the accompanying drawing which is a diagrammatic illustration of a precipitating vessel, followed by a preconcentrator and stripper suitable for carrying out the invention.

Referring to the figure, a polymer solution at a temperature of about 240° F. comprising about 4.5 percent by weight of dissolved ethylene polymer in cyclohexane is introduced through conduit 2 to precipitator 8. Precipitator 8 comprises a conical shaped vessel open at the top to conduit 2 for the admission of polymer solution and at the bottom for the discharge of polymer solvent and water. This vessel is disposed within and forms the upper portion of a cylindrical vessel 4, which is disposed vertically in a stripper 14. Within the stripper there is contained a liquid mixture 18 of water and solvent, and solid polymer. The preconcentrator 12, which comprises the lower portion of vessel 4, is disposed within the stripper vapor space 16 above liquid 18 in such a manner that material leaving the preconcentrator passes through the vapor space and into the liquid mixture without contacting the walls or other structural members of the stripper. Both precipitator 8 and preconcentrator 12 have inner surfaces wetted with moving water which flows downwardly in each vessel from the upper portion thereof. In order to provide an extended residence time of the water on the wetted surfaces the water is introduced tangentially to the upper portions thereof and flows downwardly in a spiral path. Water is supplied to the precipitator and preconcentrator through conduits 34 and 32 respectively, obtained in a manner hereinafter described.

Polymer solution admitted to precipitator 8 is passed through a spray nozzle 6 wherein it is finely subdivided and then introduced to the wetted walls of this vessel. The solution is introduced at a substantially higher temperature than the temperature of the water on the wetted wall, in this specific example about 240° F. as compared to about 130° F. The solution upon striking the wetted wall is immediately reduced in temperature which causes polymer to precipitate from solution. The combined velocities of the water and solution are such that the precipitated polymer is finely dispersed throughout the water phase. In order to minimize vaporization of solvent during the passage of this material from spray nozzle 6 to the wetted surface an inert gas is introduced to the precipitator through conduit 5. By means of this gas it is possible to maintain the pressure in the precipitator at an elevated level, in this specific example about 50 p.s.i.g., whereby the solvent is maintained in the liquid state.

The precipitated polymer, water and solvent accumulate in the bottom of the precipitator and from there is pressured as a slurry into the preconcentrator 12 wherein it is finely subdivided in spray nozzle 10 and distributed on the inner wetted wall of the preconcentrator. The velocity and degree of subdivision of the sprayed slurry are such that polymer striking the wetted surface is dispersed in the moving water in the form of small particles thereby preventing agglomeration and fouling of the preconcentrator wall. During its passage from the spray nozzle to the wetted surface the slurry is contacted with steam (introduced in a manner hereinafter described) present in the vapor space of the stripper. Due to the partial pressure of the steam a portion of the solvent is vaporized from the slurry, the heat required being supplied by the heated water on the wetted surface. The steam in the preconcentrator is also in contact with the wetted surface contained therein. As a result a continuous vaporization of solvent from the polymer-solvent-water mixture takes place as this material passes downwardly on the wetted surface and enters the liquid mixture 18.

As a result of the vaporization which takes place in the preconcentrator the material entering the liquid mixture 18 is increased in polymer content to about 7 percent, relative to the solvent present, which is above the range of concentration in which the polymer tends to agglomerate and adhere to metal surfaces.

In order that the remaining solvent may be removed from the material leaving the preconcentrator stripping steam is introduced beneath the level of liquid 18 through conduit 22. The heating and partial pressure effect of the steam is sufficient to vaporize solvent entering the liquid 18, which vapors pass into the vapor space 14 admixed with uncondensed steam. This mixture provides the source of the steam which passes into the preconcentrator 12.

Provision is made to withdraw a mixture of polymer and water substantially free of solvent from stripper 14 through conduit 24. This material is introduced to a skim tank 26 from which wet polymer is removed through conduit 27 and the major portion of the water in the mixture is removed through conduit 30. If it is desired to obtain a dried polymer, the product from conduit 27 can be subjected to a further treatment for the removal of residual water. A vapor line 38 containing a condenser 40 is provided for the removal of solvent and steam from the stripper.

It is desirable in the process to provide heated water to the preconcentrator wetted surface at a substantially higher temperature than the polymer slurry feed, preferably water of the same range of temperature that exists in the stripping zone. Accordingly, water from separator 26 is passed through pump 28 and conduits 30 and 32 to the preconcentrator. As previously mentioned, the water is admitted tangentially to the wetted surface to provide an extended residence time of the water-polymer-solvent mixture in the preconcentrating zone.

The water required in the precipitator may also be provided from the same source as the water used in the preconcentration step. In this specific example water from conduit 30 is divided with a portion passing through conduit 34 to the precipitator. Although the water from separator 26 can be used directly in the precipitator it is preferred to cool this stream, which is accomplished herein by passing the water through a cooler 36 before introducing it to the precipitator.

The preceding embodiment of the invention has been directed to a system in which the wetted surface of the precipitator comprises the inner surface of an inverted conical member. It is, however, within the scope of the invention to utilize as a wetted surface other apparatus, the only limitation being that the surface be adaptable to provide a downwardly moving film of a liquid. Thus for example, the wetted surface can comprise the inner surface of a vertically disposed cylindrical member. It is also within the scope of the invention to utilize apparatus in the preconcentrating step other than the cylindrical member shown in the drawing. The wetted surface used in this service can comprise the inner surface of an inverted frustum of a cone, a continuous helical member such as, for example, a hollow member of circular cross section in the shape of a spiral, etc. Although the stripper arrangement illustrated provides a preferred embodiment of the invention it is within the scope of the invention to use other conventional types of stripping apparatus which provide a vapor space superposed above a liquid. The precipitator is shown as an integral part of the preconcentrator; however, these vessels may be entirely separate from each other and connected by suitable conduit means.

The following data illustrates a typical application of a preferred embodiment of this invention:

*Example*

Ethylene was polymerized in a continuous process in a 20-gallon reactor in the presence of a chromium oxide-silica-alumina catalyst containing 2.5 percent by weight of chromium. Prior to the reaction, the catalyst was activated in air by subjecting it to gradually increasing temperature up to 950° F. The operating conditions under which the polymer was formed were as follows:

Ethylene feed rate _____ 135 s.c.f.h.
Cyclohexane feed rate _____ 61 lb./hr.
Polymer concentration in reactor _____ 7.9 wt. percent.
Catalyst concentration in reactor _____ 5.6 wt. percent.
Pressure _____ 420 p.s.i.g.
Temperature _____ 283° F.

Following removal of catalyst and unreacted ethylene the solution of polymer in cyclohexane was precipitated and separated from the solvent in a system similar to that of the accompanying drawing. The results are given below:

| Run No. | Polymer Solution, g.p.m. | Precip. Water, g.p.m. | Polymer Solution Temp., °F. | Precip. Water Temp., °F. | Nitrogen Flow, c.f.h. | Precip. Chamber Pressure, p.s.i.g. | Slurry Temp., °F. | Preconcentrator Water, g.p.m. | Stripper Temp., °F. | Stripper Pressure, p.s.i.g. | Type of Product |
|---|---|---|---|---|---|---|---|---|---|---|---|
| 1 | 0.30 | 2.1 | 280 | 133 | 10-15 | 53 | -------- | 16 | 160 | 0 | Uniform. |
| 2 | 0.30 | 2.1 | 280 | 125 | 12 | 53 | -------- | 16 | 160 | 0 | Uniform. |
| 3 | 0.36 | 1.5 | 285 | 121 | 10-15 | 40 | 127 | 16 | 172 | 0 | Uniform. |

Having thus described the invention by providing a specific example thereof it is to be understood that no undue restrictions or limitations are to be drawn by reason thereof and that many variations and modifications are clearly within the scope of the invention.

I claim:

1. A process for precipitating solid olefin polymers from a heated solution thereof which comprises introducing a polymer solution to a confined precipitation zone containing an inert gas phase and having a surface wetted with moving water disposed to provide downward movement of said water, said water being at a temperature below the temperature of the polymer solution, spraying the polymer solution onto said wetted surface whereby polymer is precipitated and dispersed in the water and removing a mixture of polymer, water and solvent from the precipitation zone.

2. The process of claim 1 in which the polymer solution has a temperature of between about 150° F. and about 300° F. and the wetting water has a temperature of between about 100 and about 170° F.

3. A process according to claim 1 wherein said polymer solution is a solution of a normally solid polymer of a 1-olefin having from 2 to 8 carbon atoms per molecule and no branching nearer the double bond than the 4-position in a solvent hydrocarbon selected from the group consisting of paraffins having from 3 to 12 carbon atoms per molecule, cyclohexane and methylcyclohexane.

4. In a process for the recovery of solid olefin polymers from a heated solution thereof in which the polymers are precipitated from solution by contact with water and in which solvent is separated from the precipitated polymer by heating and stripping, during which treatment the polymer passes through a range of polymer to solvent concentration wherein it tends to agglomerate and adhere to metal surfaces, the improvement which comprises introducing a polymer solution to a confined precipitation zone containing an inert gas under pressure and having a first surface wetted with moving water which is at a temperature below the temperature of the polymer solution, spraying the polymer solution onto said wetted surface whereby polymer is precipitated and dispersed in the water, pressuring a mixture of polymer, water, solvent and entrained inert gas from the precipitation zone to a preconcentrating zone having a second surface wetted with heated moving water whereby solvent is vaporized from the mixture and the mixture is passed through the agglomerating range of polymer concentration, spraying the mixture onto said second surface, contacting the second wetted surface with steam and introducing the mixture to a steam stripping zone wherein the remaining solvent is removed by heat and stripping.

5. The process of claim 4 in which the wetted surfaces of the precipitation zone and the preconcentrating zone comprise vertically disposed continuous concave surfaces to which water is introduced tangentially.

6. The process of claim 4 in which the preconcentrating zone is disposed within and in open communication with the vapor space of the steam stripping zone.

7. A process for separating solid olefin polymers from a heated solution thereof which comprises introducing a polymer solution containing between about 2 and about 6 percent polymer by weight to a confined precipitation zone containing an inert gas under pressure and having a first surface wetted with moving water, having a temperature below the temperature of the polymer solution, spraying the polymer solution onto said surface whereby polymer is precipitated and dispersed in the water, pressuring a mixture of polymer, water, solvent and entrained inert gas from the precipitation zone to a preconcentrating zone having a second surface wetted with heated moving water whereby solvent is vaporized from the mixture in sufficient quantity to increase the polymer concentration thereof to above about 6 percent by weight based on the solvent, spraying the mixture onto said second surface, contacting the second wetted surface with steam and introducing the mixture to a steam stripping zone wherein the remaining solvent is removed by heat and stripping.

8. The process of claim 7 in which the polymers are polymers of ethylene.

9. The process of claim 7 in which the polymers are polymers of ethylene having a density of above 0.94 and a crystallinity of at least 70 percent.

10. In a process for the recovery of solid olefin polymers from a heated solution thereof, in which the polymers are precipitated from solution by contact with water and in which solvent is separated from the precipitated polymer by heating and stripping, during which treatment the polymer passes through a range of polymer to solvent concentration wherein it tends to agglomerate and adhere to metal surfaces, the improvement which comprises introducing a polymer solution to a confined precipitation zone containing an inert gas under pressure and having a first surface wetted with moving water disposed to provide downward movement of said water, said water being at a temperature below the temperature of the polymer solution, spraying the polymer solution onto said wetted surface whereby polymer is precipitated and dispersed in the water, pressuring a mixture of polymer, water, solvent and entraining inert gas from the precipitation zone to a preconcentrating zone having a second surface wetted with heated moving water spraying the mixture onto the second wetted surface whereby solvent is vaporized from the mixture, contacting the sprayed mixture with steam before it reaches the second wetted surface, continuing contact of the seam with the mixture while the mixture is on the second wetted surface, retaining the mixture on the second wetted surface for a sufficient period of time to increase the polymer concentration thereof to above about 6 percent by weight based on the solvent and introducing the mixture and water to a steam stripping zone wherein the remaining solvent is removed by heat and stripping.

References Cited in the file of this patent

UNITED STATES PATENTS

| | | |
|---|---|---|
| Re. 22,210 | De Simo et al. | Oct. 27, 1942 |
| 1,157,935 | Gray | Oct. 26, 1915 |
| 1,553,748 | Caspar | Sept. 16, 1925 |
| 1,678,819 | Koch | July 31, 1928 |
| 2,472,037 | Wurth et al. | May 21, 1949 |
| 2,475,643 | Seebold | July 12, 1949 |
| 2,530,144 | Bannon | Nov. 14, 1950 |
| 2,599,067 | Otto | June 3, 1952 |
| 2,607,763 | Hipkin et al. | Aug. 19, 1952 |
| 2,728,753 | Russum et al. | Dec. 27, 1955 |
| 2,766,224 | Bannon | Oct. 9, 1956 |